United States Patent
Holland

(10) Patent No.: US 7,693,197 B2
(45) Date of Patent: Apr. 6, 2010

(54) LASER SCANNING APPARATUSES, LASER SCANNING METHODS AND ARTICLE MANUFACTURE

(75) Inventor: William D. Holland, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1233 days.

(21) Appl. No.: 10/700,956

(22) Filed: Oct. 31, 2003

(65) Prior Publication Data

US 2005/0094683 A1 May 5, 2005

(51) Int. Cl.
*H01S 3/10* (2006.01)
*H01S 3/00* (2006.01)

(52) U.S. Cl. ..................... 372/38.02; 372/24

(58) Field of Classification Search ............ 372/24, 372/29.021, 38.01, 38.02, 38.07; 347/236, 347/237, 246, 247
See application file for complete search history.

(56) References Cited

U.S. PATENT DOCUMENTS

| | | | |
|---|---|---|---|
| 4,270,131 A * | 5/1981 | Tompkins et al. | 347/250 |
| 4,862,289 A * | 8/1989 | Shimada | 347/247 |
| 5,068,868 A * | 11/1991 | Deppe et al. | 372/45.01 |
| 5,136,160 A | 8/1992 | Nakane et al. | |
| 5,745,152 A * | 4/1998 | Vincent et al. | 347/238 |
| 5,750,986 A * | 5/1998 | Genovese | 250/235 |
| 5,761,229 A | 6/1998 | Baldwin et al. | |
| 5,771,254 A | 6/1998 | Baldwin et al. | |
| 5,809,050 A | 9/1998 | Baldwin et al. | |
| 5,832,012 A * | 11/1998 | Araki et al. | 372/24 |
| 5,986,687 A * | 11/1999 | Hori | 347/246 |
| 6,141,031 A * | 10/2000 | Nowak et al. | 347/236 |
| 6,198,497 B1 * | 3/2001 | Luque | 347/247 |
| 6,263,002 B1 * | 7/2001 | Hsu et al. | 372/6 |
| 2002/0024586 A1 * | 2/2002 | Nakatsuka et al. | 347/246 |

FOREIGN PATENT DOCUMENTS

EP 1014145 6/2000

* cited by examiner

*Primary Examiner*—Armando Rodriguez

(57) ABSTRACT

Laser scanning apparatus, methods, and article of manufacture are described. In one embodiment, a laser scanning apparatus includes a light source configured to emit a light beam in a single direction, a scanning device optically coupled with the light source and configured to scan the light beam along a photoconductor in a plurality of scan lines. The laser scanning apparatus also includes a start-of-scan detector assembly configured to sample the light beam and initiate a start-of-scan operation of one of the scan lines of information to be written on the photoconductor, and wherein the sampled light beam is used to control a drive level of the light source.

47 Claims, 5 Drawing Sheets

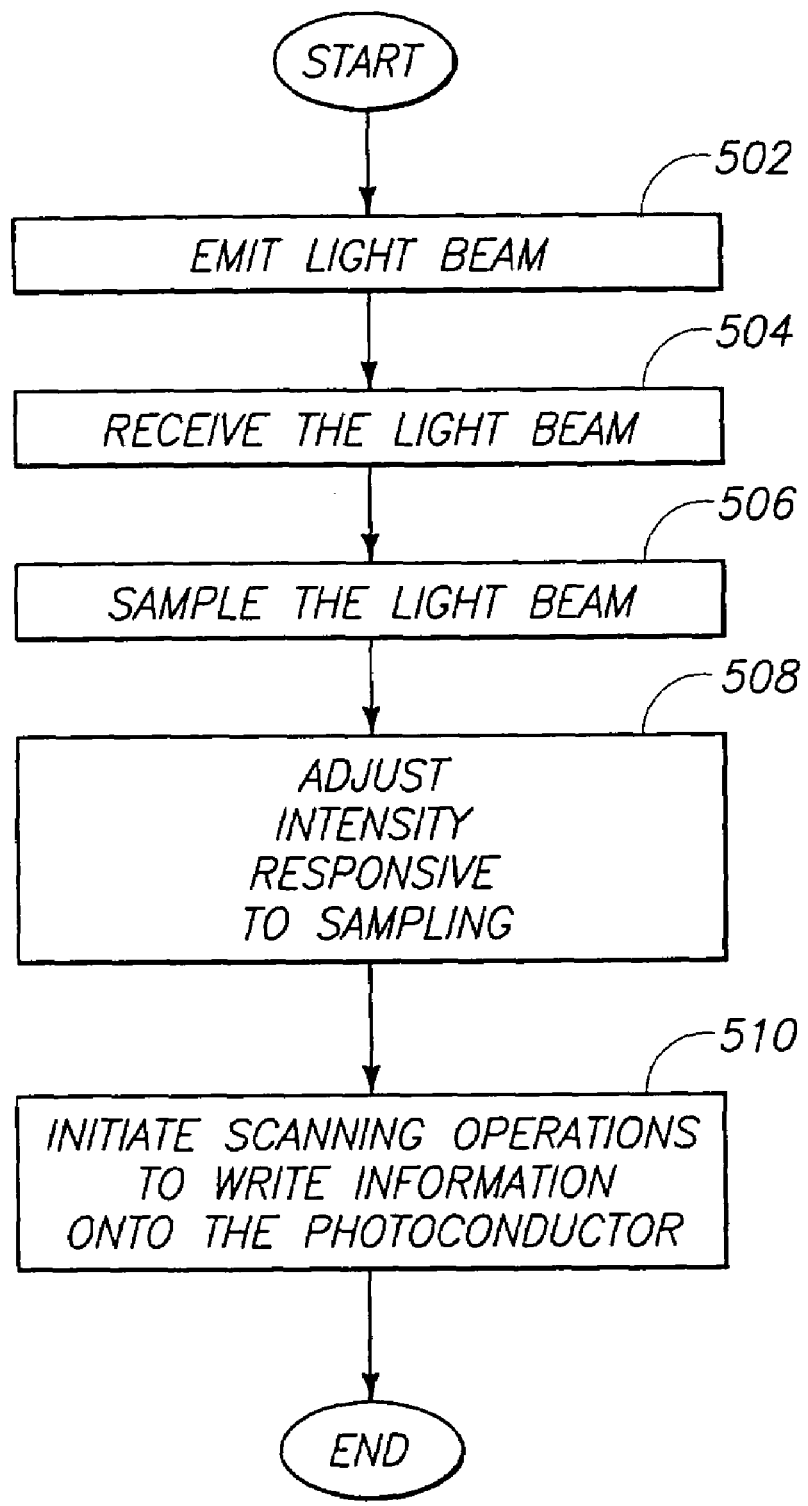

LASER SCANNING APPARATUSES, LASER SCANNING METHODS AND ARTICLE MANUFACTURE

FIELD OF THE INVENTION

Aspects of the invention relate to laser scanning apparatuses, laser scanning methods, and article of manufacture.

BACKGROUND OF THE INVENTION

Lasers are used as light sources in many consumer and industrial products including laser printers and optical communication links. In laser printers, light output of the laser may be modulated to selectively discharge the photoconductive drum. In optical communication links, the light output of the laser may be modulated to represent the states of a digital information signal. Lasers having a modulated light output are also used to write a digital information signal on an optical disc, for example. In these and other applications, the need to modulate the output of the laser to controlled power levels normally precludes modulating the light output by simply switching the laser on and off.

Recently, vertical-cavity surface-emitting lasers (VCSELs) have been introduced. Such lasers may be formed in a structure of semiconductor layers deposited on a semiconductor substrate, and emit light from a port in the surface of the structure, instead of from a very narrow region on the cleaved edge of the device, as in an edge-emitting laser. A VCSEL offers numerous performance advantages over an edge-emitting laser. For example, a VCSEL inherently has a smaller numeric aperture and generates a light beam of increased symmetry compared with an edge-emitting laser. As a result, the light from the VCSEL can be coupled into an optical system of the laser printer or optical communication link more efficiently than the light from the edge-emitting laser. However, the VCSEL generally emits a light beam in a single direction instead of the multiple light beams emitted by the edge-emitting laser. Accordingly, a VCSEL-based light source generating light with a controlled intensity cannot be implemented simply by substituting a VCSEL for an edge-emitting laser in a laser scanning apparatus which utilizes a second light beam from the source for controlling the output of the source. An alternative arrangement is desired to monitor and/or control the intensity of the light generated by the VCSEL.

Some devices split off a portion of a light beam output from a VCSEL light source and direct one of the beams towards a monitor photodiode. However, splitting of the light beam for monitoring involves additional complexity along with added costs.

Aspects described herein provide improved laser scanning apparatuses and laser scanning methods.

SUMMARY OF THE INVENTION

At least some embodiments of the invention relate to laser scanning apparatuses, laser scanning methods, and article of manufacture.

In one embodiment, a laser scanning apparatus is disclosed. The laser scanning apparatus includes a light source configured to emit a light beam in a single direction, a scanning device optically coupled with the light source and configured to scan the light beam along a photoconductor in a plurality of scan lines. The laser scanning apparatus also includes a start-of-scan detector assembly configured to sample the light beam and initiate a start-of-scan operation of one of the scan lines of information to be written on the photoconductor, and wherein the sampled light beam is used to control a drive level of the light source.

In another aspect, a laser scanning method is disclosed. The method includes emitting a light beam in a single direction using a light source, providing a rotating scanning device and a photoconductor. The light beam is scanned along the photoconductor using the rotating scanning device, and the light beam from the rotating scanning device is sampled using a sampling assembly. The method also includes controlling a drive level of the light source responsive to the sampled light beam, and initiating writing of a scan line of information onto the photoconductor using the sampling assembly.

DESCRIPTION OF THE DRAWINGS

FIG. 7 is a flow chart of a methodology to monitor and control output power of a light source according to one embodiment.

DETAILED DESCRIPTION OF THE INVENTION

At least some embodiments of the invention relate to laser scanning apparatuses, laser scanning methods, and article of manufacture.

Figure 1:
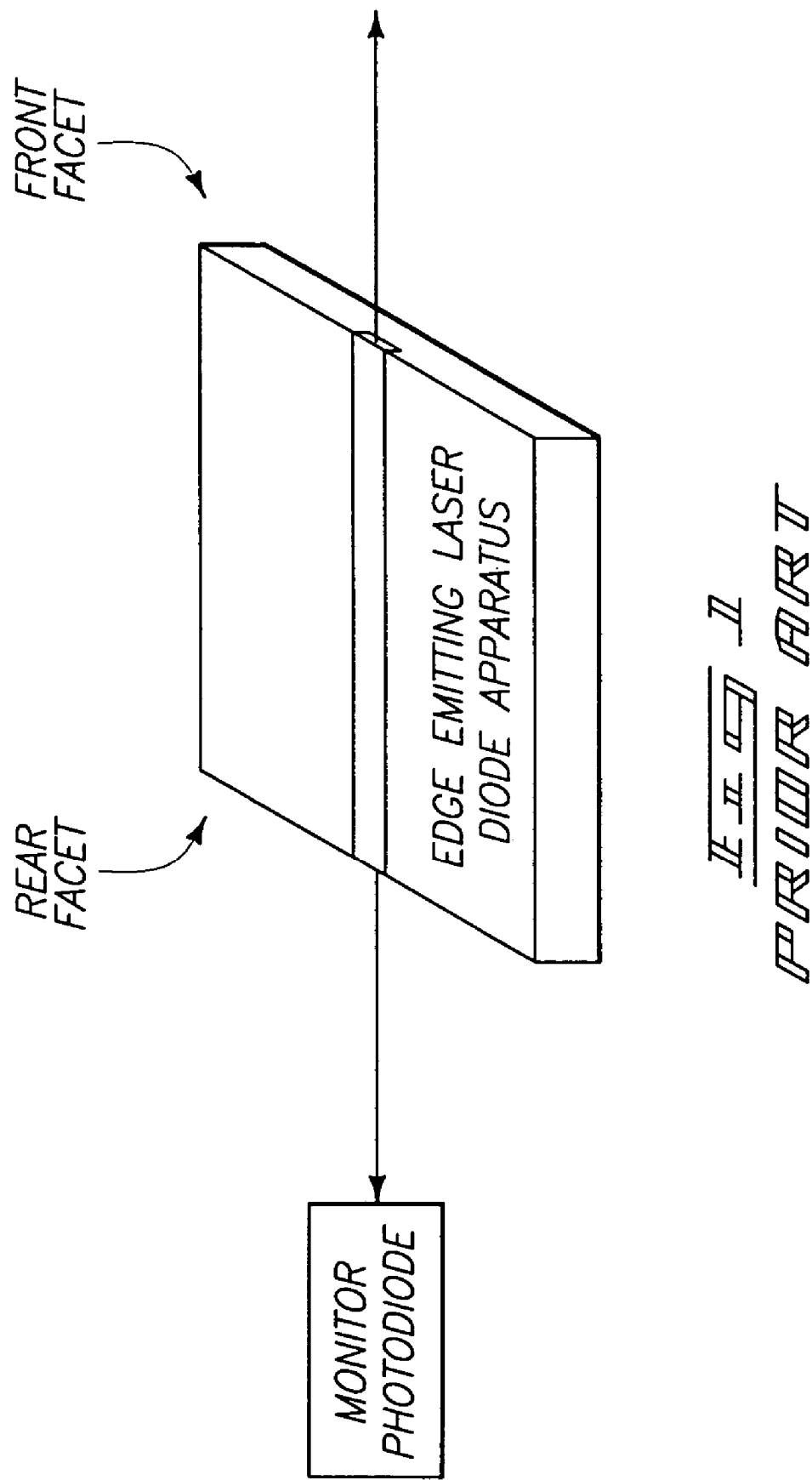
FIG. 1 is a prior art edge-emitting laser diode light source having a monitor photodiode.
Figure 2:
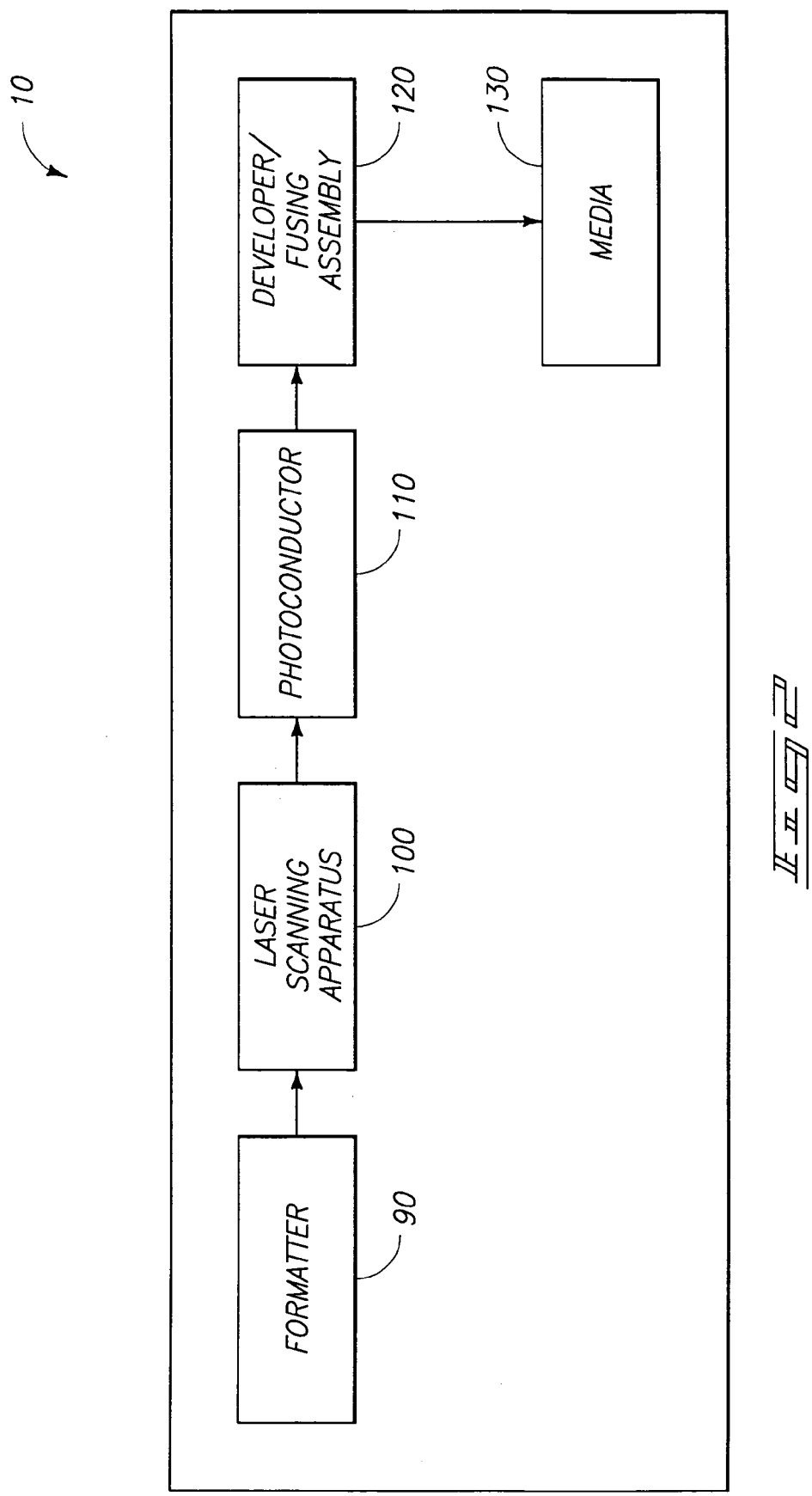
FIG. 2 is a high-level block diagram of a hard imaging device according to one embodiment.

Referring to FIG. 2, an exemplary high-level block diagram of a hard imaging device 10 is shown in accordance with one embodiment of the invention. The exemplary hard imaging device 10 comprises a laser printer. Other configurations configured to form hard images upon media 130 are possible, and include for example, multi-function peripherals, copiers, facsimile devices, etc. The depicted hard imaging device 10 configured as a laser printer includes a formatter 90, a laser scanning apparatus 100, a photoconductor or a photoconductive member 110, and a developer/fusing assembly 120.

The formatter 90 may be configured to perform image data processing operations (e.g., rasterization) of data received by the formatter 90 from an external source (not shown), internally generated, or otherwise accessed.

The laser scanning apparatus 100 is configured to scan information formatted by the formatter 90. Further details of an exemplary configuration of the laser scanning apparatus 100 are described below at FIG. 3.

The photoconductor 110 includes a rotating imaging surface configured to receive information scanned by the laser scanning apparatus 100. One or more lines of information (e.g., information formatted by the formatter 90) may be scanned by the laser scanning apparatus 100 onto the photoconductor 110.

The developer/fusing assembly 120 may be configured to develop information written onto the photoconductor 110 using a marking agent (e.g., toner), and transfer and fuse the developed image to media 130 (e.g., hard-imaging media such as paper, transparencies, etc.). Assembly 120 may be referred to as an image engine in one embodiment.

Figure 3:
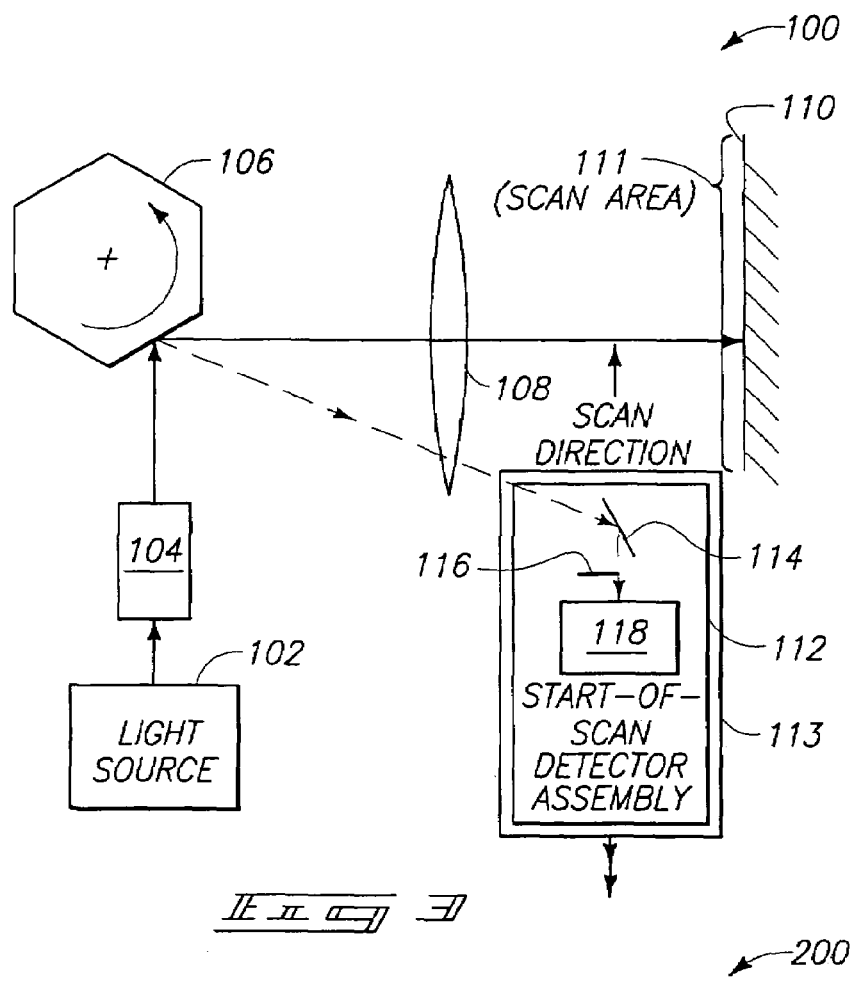
FIG. 3 is a functional schematic of a laser scanning apparatus according to one embodiment.

Referring to FIG. 3, an exemplary laser scanning apparatus 100 as shown in FIG. 2 and arranged according to one embodiment is illustrated. The depicted laser scanning apparatus 100 includes a light source 102, initial optics 104, a scanning device 106, a lens 108, and a start-of-scan detector assembly 112.

In one embodiment, the light source 102 is configured to only emit a light beam in a single direction. Other configurations of light sources 102 capable of emitting a light beam for use herein are possible.

The initial optics 104 may include optical elements (e.g., collimating lens) configured to focus a light beam from the light source 102 onto the scanning device (e.g., a facet of the scanning device) 106 for scanning the light beam onto a photoconductor 110.

The scanning device 106 is optically coupled with the light source 102 and configured to scan a light beam emitted from the light source 102 onto photoconductor 110. In one embodiment, the scanning device 106 may be a rotating polygon mirror. Other configurations for scanning a light beam onto the photoconductor 110 are possible.

In one configuration, lens 108 may be used to focus a light beam from the scanning device 106 onto the photoconductor 110. The lens 108 may be configured so as to scan the light beam onto the photoconductor 110 in a plurality of scan lines corresponding to respective facets of an exemplary rotating polygonal scanning device 106. A scan direction of the light beam onto the photoconductor 110 is illustrated in FIG. 3. Light is repeatedly scanned in an upward scan direction corresponding to respective rotating facets of scanning device 106. Photoconductor 110 is configured to rotate about an axis parallel with the scan direction during scanning operations to receive a plurality of scan lines of information.

In one embodiment, the start-of-scan detector assembly 112 comprises a mirror 114, a device 116 (e.g., a knife edge device), and a photodetector 118 configured to capture light scanned by the scanning device 106 for triggering start-of-scan operations for writing information from formatter 90 onto photoconductor 110 in respective scan lines. A single photodetector 118 is shown for purposes of illustration. A plurality of photodetectors are possible in other embodiments. In the exemplary embodiment, mirror 114 is configured so as to reflect a light beam scanned by the scanning device 106 towards the photodetector 118. Interruption of the light beam by the device 116 is used to initiate start-of-scan operations for respective scan lines. The interruption of the light beam by device 116 is used to determine timing to initiate writing of respective lines of information (e.g., information from formatter 90) onto the photoconductor 110 in one embodiment.

As described in detail below, light is sampled to control the drive level of light source 102 using a sampling assembly 113. An exemplary configuration of sampling assembly 113 comprises start-of-scan detector assembly 112 although other configurations are possible. In one embodiment, the light beam reflected from the scanning device 106 onto the photodetector 118 comprises a sampled light beam used to determine an intensity of the light beam outputted from light source 102. As described below in one example, the sampled light beam is used to implement feedback control of intensity of light outputted by the light source 102. In one embodiment, the intensity of light received at photodetector 118 closely matches the intensity of light outputted by the light source 102 without being diminished (e.g., no light is split from light source 102 in one embodiment).

Sampling of the light beam from the light source 102 is performed before a scan line is written on the photoconductor 110 in order to control an output power of the light source 102 in the exemplary arrangement wherein sampling assembly 113 is implemented using assembly 112. Thus, output power of the light source 102 is determined, by the above described exemplary sampling, prior to initiating a scan of the light beam onto the photoconductor 110 for a respective scan line.

In one embodiment, the start-of-scan detector assembly 112 is disposed outside of a scan area 111 of the photoconductor 110 as illustrated in FIG. 3. The scan area 1.11 corresponds to an area where scan lines are written upon the photoconductor 110 in one embodiment.

The photodetector 118 may be configured to generate an electrical signal representing the intensity of received light energy. The intensity of the light energy received by the photodetector 118 may be an indication of output power of the light source 102. The output power of the light source 102 may be varied by varying its drive level using a feedback arrangement using output of photodetector 118 corresponding to received light as described below with respect to FIG. 4.

In one embodiment, the sampling assembly 113 including photodetector 118 samples for individual scan lines light output of light source 102 once per respective scan line, and the sampling is used to control the drive level of the light source 102 for the entire respective scan line following the sampling of the light output of the light source 102. In one such arrangement, the light beam from the light source 102 may be sampled by the start-of-scan assembly 112 before the scan line is written onto the photoconductor 110. The intensity of light for the next scan line may be different responsive to respective sampling by sampling assembly 113 for that respective scan line. Other alternatives of the sampling frequency (e.g., sampling more than once during writing of a single line of information on the photoconductor 110) are possible depending on the characteristics of a light source 102, the configuration of the sampling assembly 113, etc.

Figure 4:
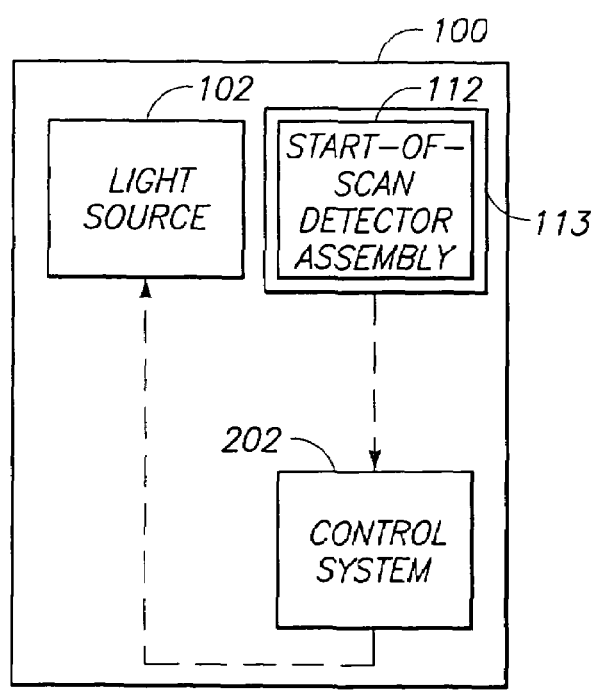
FIG. 4 is a block diagram of the laser scanning apparatus with a control system according to one embodiment.

FIG. 4 shows a functional block diagram 200 for controlling a drive level of light source 102 to achieve a desired output power, in accordance with an embodiment of the invention. It may be desired to maintain the intensity of light source 102 substantially constant during imaging operations in one embodiment (e.g., imaging a plurality of scan lines of an image or plurality of images being formed).

The control system 202 is configured to receive an output signal from the sampling assembly 113, the output signal representing an output power of the light beam from the light source 102 and sampled in a manner as described above at FIG. 3. For example, an output signal from the sampling assembly 113 provides feedback to control system 202 for comparison operations. The control system 202 is configured to compare the output power of the sampled light beam with a predetermined value(s) and issue control signals to control a drive level of the light source 102 in order to maintain a desired output power level of the light source 102 during writing of information (e.g., single line of information) onto the photoconductor 110. The control signals issued by the control system 202 may be applied to appropriate circuitry (not shown) of the light source 102 in order to control a drive level of the light source 102, thereby controlling an output power of the light source 102. In one embodiment, control system 202 outputs control signals to provide a substantially constant output of light intensity from light source 102 during individual scan lines, during scan of all lines, or during other desired period.

Figure 5:
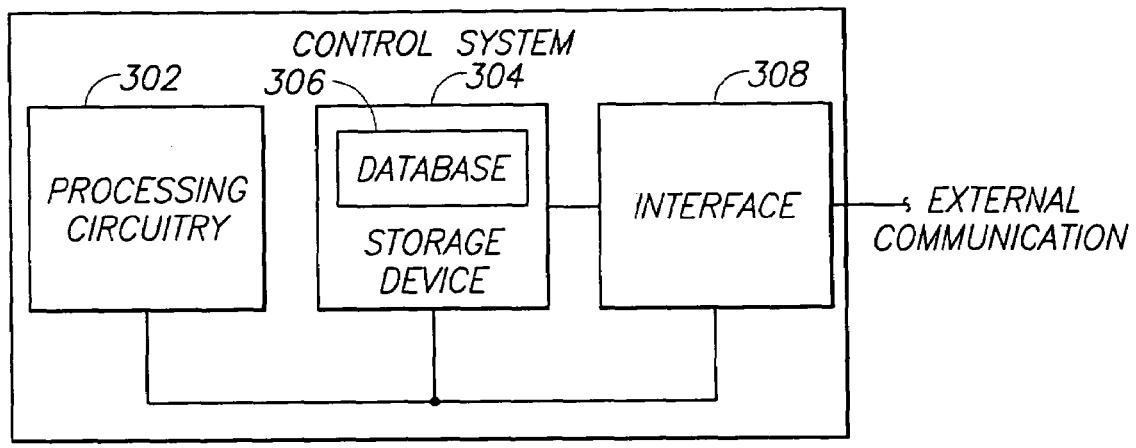
FIG. 5 is a block diagram illustrating exemplary details of a control system according to one embodiment.

FIG. 5 is a functional block diagram illustrating additional details of an exemplary control system 202 configured to control an output power of the light source 102 (FIG. 3). In one embodiment, the control system 202 comprises processing circuitry 302, a storage device 304 having a database 306, and an interface 308. Other implementations of the control system 202 are possible.

The processing circuitry 302 may be configured to receive an output signal from the sampling assembly 113 and to process the received signal by performing a comparison of the received signal with predetermined value(s) stored, for example, in the storage device 304. For example, predetermined values may be set in a database 306 by the manufacturer to provide a substantially constant output of light from the light source 102 (FIG. 3).

Accordingly, processing circuitry 302 may be configured to process data and issue control signals to control an output power of the light source 102 of the laser scanning apparatus 100 (FIG. 3). In one embodiment, processing circuitry 302 may comprise circuitry configured to execute provided programming. For example, processing circuitry 302 may be implemented as a microprocessor or other structure configured to execute executable instructions of programming including, for example, software and/or firmware instructions. Other exemplary embodiments of processing circuitry 302 include hardware logic, PGA, FPGA, ASIC, and/or other structures. These examples of processing circuitry 302 are for illustration and other configurations are possible for implementing operations discussed herein.

As mentioned above in one example, the storage device 304 may be configured to store predetermined value(s) corresponding to one or more desired output power level(s) in database 306. For example, the predetermined value(s) may be stored in the form of a table in the database 306 of the storage device 304, and the stored information may be configured for retrieval by the processing circuitry 302. In one embodiment, processing of signals or values received from the sampling assembly 113 is performed in order to determine a deviation of a received signal when compared to a predetermined value(s) retrieved from the storage device 304.

The storage device 304 may also be configured to store electronic data, file systems having one or more electronic files, programming such as executable instructions (e.g., software and/or firmware for use by processing circuitry 302), and/or other digital information and may include processor-usable media. Processor-usable media includes any article of manufacture which can contain, store, or maintain programming, data and/or digital information for use by or in connection with an instruction execution system including processing circuitry in the exemplary embodiment. Stored programming may be configured to cause processing circuitry 302 to adjust an output power level of the light source 102 responsive to output of the start-of-scan detector assembly 112 in one embodiment. Exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Interface 308 may be configured to communicate electronic data or control signals externally of the control system 202, for example, with respect to the light source 102 and sampling assembly 113. In one embodiment, interface 308 may be arranged to receive information from an external device (e.g., sampling assembly 113), and communicate information to an external device (e.g., light source 102) for controlling a drive level of the external device, (e.g., light source 102).

Figure 6:
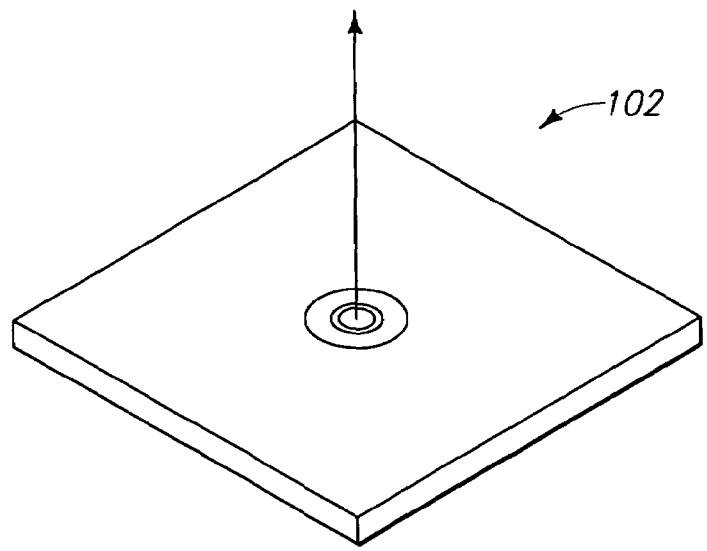
FIG. 6 is an illustration of an exemplary light source shown in FIG. 3 emitting a light beam in a single direction according to one embodiment.

FIG. 6 illustrates an exemplary light source (e.g., vertical cavity surface emitting laser (VCSEL)) emitting a light beam in only a single direction. Other light source configurations are possible.

Referring to FIG. 7, an exemplary methodology performed by the laser scanning apparatus 100 (FIG. 3) for sampling output power of the light source 102 (FIG. 3), and the control system 202 (FIG. 4) for controlling a drive level of the light source 102 (FIG. 3) is shown. Other methods are possible including more, less or alternative steps.

At a step 502, a light beam is emitted from the light source towards the scanning device.

At a step 504, the light beam emitted from the light source is received in a sampling assembly (e.g., photodetector of the sampling assembly).

At a step 506, the received light beam is sampled by the sampling assembly to determine an output power (e.g., intensity) of the light beam. The sampling of the light beam is preferably performed before initiating start-of-scan operations to write a respective line of information onto the photoconductor.

At a step 508, the processing circuitry of the control system determines if the intensity (e.g., output power) of the light beam from the light source is within predetermined limits during scanning of information (e.g., a respective scan line of information) onto the photoconductor. If appropriate, the processing circuitry may vary a control signal provided to the light source to provide light having a substantially constant intensity of a predetermined level in one embodiment. If the light intensity is within an acceptable range, the control signal may be unchanged.

At a step 510, start-of-scan operations may be implemented wherein data for the scan line is applied to the light source to write a respective scan line of information onto the photoconductor.

One advantage of the present invention is that it eliminates a need for splitting a beam of light from the light source to monitor output power of the light source, thus reducing complexity of the arrangement and reducing costs.

The protection sought is not to be limited to the disclosed embodiments, which are given by way of example only, but instead is to be limited only by the scope of the appended claims.

What is claimed is:

1. A laser scanning apparatus comprising:
   a light source configured to generate a single light beam;
   a scanning device optically coupled with the light source and configured to scan the single light beam along a photoconductor in a plurality of scan lines; and
   a start-of-scan detector assembly configured to sample the single light beam and initiate a start-of-scan operation of one of the scan lines of information to be written on the photoconductor, and wherein only the sampled single light beam is used to control a drive level of the light source to be substantially constant during scanning of the one of the scan lines.

2. The apparatus of claim 1, further comprising:
   a control system configured to receive a signal from the detector assembly and to control the drive level of the light source based on the signal.

3. The apparatus of claim 2, wherein the control system comprises processing circuitry configured to compare an indication of the sampled single light beam from the signal with a predetermined value.

4. The apparatus of claim 2, wherein the control system is configured to maintain the drive level of the light source at a predetermined drive level during scanning of the one scan line.

5. The apparatus of claim 1, wherein the light source comprises a vertical cavity surface emitting laser diode (VCSEL).

6. The apparatus of claim 1, wherein the single light beam is sampled only once per scan line of information written on the photoconductor, and the single light beam is sampled prior to writing the scan line of information on the photoconductor.

7. The apparatus of claim 1, wherein the scanning device comprises a rotating polygon mirror.

8. The apparatus of claim 1, wherein the start-of-scan detector assembly is disposed outside of a scan area of the photoconductor.

9. A laser scanning apparatus comprising;
a rotating scanning device configured to scan a light beam from a light source;
a photodetector optically coupled with the rotating scanning device and configured to sample the light beam from the rotating scanning device;
a control system configured to receive an indication of the sampled light beam from the photodetector and to control a drive level of the light source using only the indication of the sampled light beam; and
wherein the control system is configured to maintain the light source at a substantially constant drive level during scanning of a single line of information on the photoconductor.

10. The apparatus of claim 9, wherein the light source is configured to emit light in a single direction.

11. The apparatus of claim 9, wherein the light source comprises a vertical cavity surface emission laser diode (VCSEL).

12. The apparatus of claim 9, wherein the control system comprises processing circuitry configured to compare an indication of the sampled light beam with a predetermined drive level value, and to control the drive level of the light source based on the comparison.

13. A laser scanning apparatus comprising:
a laser configured to generate a single light beam;
a scanning device configured to scan the single light beam from the laser;
a photodetector optically coupled with the scanning device and configured to sample the single light beam only once per line of information scanned onto a photoconductor; and
a control system configured to receive an indication of the sampled single light beam from the photodetector and to maintain a drive level of the laser at a substantially constant drive level during scanning of the line of information onto the photoconductor using only the indication of the sampled single light beam.

14. The apparatus of claim 13, wherein the laser is configured to emit the single light beam in a single direction.

15. The apparatus of claim 13, wherein the photodetector is utilized to initiate a start of scan operation of the line of information.

16. The apparatus of claim 13, wherein the sampled single light beam is obtained before scanning a line of information onto the photoconductor.

17. A laser scanning apparatus comprising;
means for generating a single light beam;
means for scanning the single light beam onto a photoconductor;
means for sampling the single light beam which causes information to be scanned onto the photoconductor; and
means for receiving an indication of the sampled single light beam from the means for sampling and for maintaining the means for generating at a substantially constant drive level using only the indication of the sampled single light beam and during scanning of the line of information onto the photoconductor.

18. The apparatus of claim 17, wherein the means for generating comprises a laser.

19. The apparatus of claim 17, wherein the single light beam is sampled before writing a scan line of information onto the photoconductor.

20. The apparatus of claim 17, wherein the means for sampling is disposed outside of a scan area of the photoconductor.

21. A laser scanning method comprising:
generating a single light beam using a light source;
scanning the single light beam along a photoconductor using a rotating scanning device;
sampling only the single light beam from the rotating scanning device using a sampling assembly;
controlling the light source only using the sampling of only the single light beam; and
as a result of the controlling, maintaining an output power of the light source at a substantially constant level during writing of a single scan line of information onto the photoconductor.

22. The method of claim 21, further comprising:
initiating writing of a scan line of information onto the photoconductor using the sampling assembly.

23. The method of claim 21, wherein the controlling comprises:
receiving the sampled single light beam in a control system;
comparing an indication of the sampled single light beam with a predetermined drive level value; and
wherein the controlling comprises controlling a drive level of the light source using the comparison.

24. The method of claim 21, wherein the maintaining comprises maintaining the output power of the light source at the substantially constant level during the writing of the entirety of the single scan line of information onto the photoconductor.

25. The method of claim 21, wherein the light source comprises a vertical cavity surface emitting laser diode (VCSEL).

26. The method of claim 21, wherein the sampling is performed only once per scan line of information written on the photoconductor and prior to writing the scan line of information on the photoconductor.

27. The method of claim 21, wherein the sampling assembly is located outside of a scan area of the photoconductor.

28. A hard imaging device comprising:
a photoconductor
a laser scanning apparatus configured to write scan lines of information onto the photoconductor, the laser scanning apparatus comprising:
a laser configured to generate a single light beam;
a scanning device optically coupled with the laser and configured to scan the single light beam along the photoconductor to term the scan lines;

a sampling assembly optically coupled with thin scanning device and configured to sample the single light beam and to generate a signal indicative of the sampling of the single light beam;

a control system configured to control an intensity of the single light beam generated by the laser to be substantially constant during scanning of a line of information upon the photoconductor using only the signal indicative of the sampling of the single light beam; and an image engine configured to form hard images from the written scan lines using media.

29. The device of claim 28, wherein the control system is configured to receive the signal indicative of only the sampling of only the single light beam and to control a drive level of the light source based entirely on the received signal.

30. An article of manufacture comprising:

processor-usable media comprising programming configured to cause processing circuitry to:

output a control signal to control a light source configured to generate a single light beam used to scan a plurality of scan lines of information onto a photoconductor;

access an output of a start-of-scan detector assembly which is indicative of only the single light beam, wherein the output indicates appropriate timing for initiation of writing of the information for the respective scan lines;

process the output of the start-of-scan detector assembly; and adjust the control signal using only the processing of the output to adjust an intensity of the single light beam generated by the light source.

31. The article of manufacture of claim 30, wherein the programming is further configured to cause the processing circuitry to adjust the control signal to provide the single light beam having a substantially constant intensity during the scanning of the scan lines.

32. The apparatus of claim 1 wherein the light source comprises a laser configured to generate the single light beam.

33. The apparatus of claim 32 wherein the laser is configured to generate all of the photons which are sampled by the detector assembly.

34. The apparatus of claim 32 wherein the laser is configured to generate the single light beam void of any light received by the laser.

35. The apparatus of claim 32 further comprising a control system configured to provide a control signal to control the drive level of the laser during the generation of the single light beam, and wherein the control system is configured to vary the control signal using the sampled single light beam.

36. The apparatus of claim 1 wherein the light source is configured to generate an entirety of the single light beam for the first time, and wherein the single light beam is void of any other light generated by a source different than the light source.

37. The apparatus of claim 9 further comprising the light source comprising a laser configured to generate the light beam.

38. The method of claim 21 wherein the generating comprises generating using the light source comprising a laser, and the controlling comprises controlling the laser.

39. The method of claim 21 wherein the generating comprises generating all light of the single light beam using the light source.

40. The method of claim 21 wherein the controlling comprises:

applying a control signal to control the light source; and varying the control signal using only the sampling of only the single light beam.

41. The method of claim 28 wherein the varying comprises varying to control the light source to generate the single light beam having a substantially constant intensity.

42. The device of claim 28 wherein the sampling assembly is configured to initiate start-of-scan operations to write the scan lines onto the photoconductor.

43. The apparatus of claim 9 further comprising the light source, and wherein the light source is configured to only generate the light beam comprising only a single light beam, and the photodetector is configured to sample the single light beam and to provide the indication of only the sampled single light beam.

44. The apparatus of claim 13 wherein the photodetector is configured to provide the indication of only the sampled single light beam.

45. The apparatus of claim 17 wherein the means for sampling comprises means for providing the indication of only the sampled single light beam.

46. The apparatus of claim 1 wherein the start-of-scan detector assembly is configured to initiate the start-of-scan operation comprising indicating appropriate timing to initiate writing of the one of the scan lines of information on the photoconductor.

47. The apparatus of claim 9 wherein the photodetector comprises a photodetector of a start-of-scan detector assembly and the control system is configured to initiate a start-of-scan operation as a result of the reception of the indication of the sampled light beam from the photodetector.

* * * * *

UNITED STATES PATENT AND TRADEMARK OFFICE
CERTIFICATE OF CORRECTION

| | | |
|---|---|---|
| PATENT NO. | : 7,693,197 B2 | Page 1 of 1 |
| APPLICATION NO. | : 10/700956 | |
| DATED | : April 6, 2010 | |
| INVENTOR(S) | : William D. Holland | |

It is certified that error appears in the above-identified patent and that said Letters Patent is hereby corrected as shown below:

On the Title page, in Item (54), Title, in column 1, line 3, before "MANUFACTURE" insert -- OF --.

In column 1, line 3, before "MANUFACTURE" insert -- OF --.

In column 7, line 21, in Claim 9, delete "comprising;" and insert -- comprising: --, therefor.

In column 8, line 1, in Claim 17, delete "comprising;" and insert -- comprising: --, therefor.

In column 8, line 60, in Claim 28, delete "photoconductor" and insert -- photoconductor; --, therefor.

In column 8, line 67, in Claim 28, delete "term" and insert -- form --, therefor.

In column 9, line 1, in Claim 28, delete "thin" and insert -- the --, therefor.

In column 10, line 22, in Claim 41, delete "claim 28" and insert -- claim 40 --, therefor.

Signed and Sealed this

Ninth Day of November, 2010

David J. Kappos
*Director of the United States Patent and Trademark Office*